Nov. 29, 1938.  O. V. MYERS  2,138,190
FISH TACKLE BOY
Filed Feb. 10, 1938  2 Sheets-Sheet 2
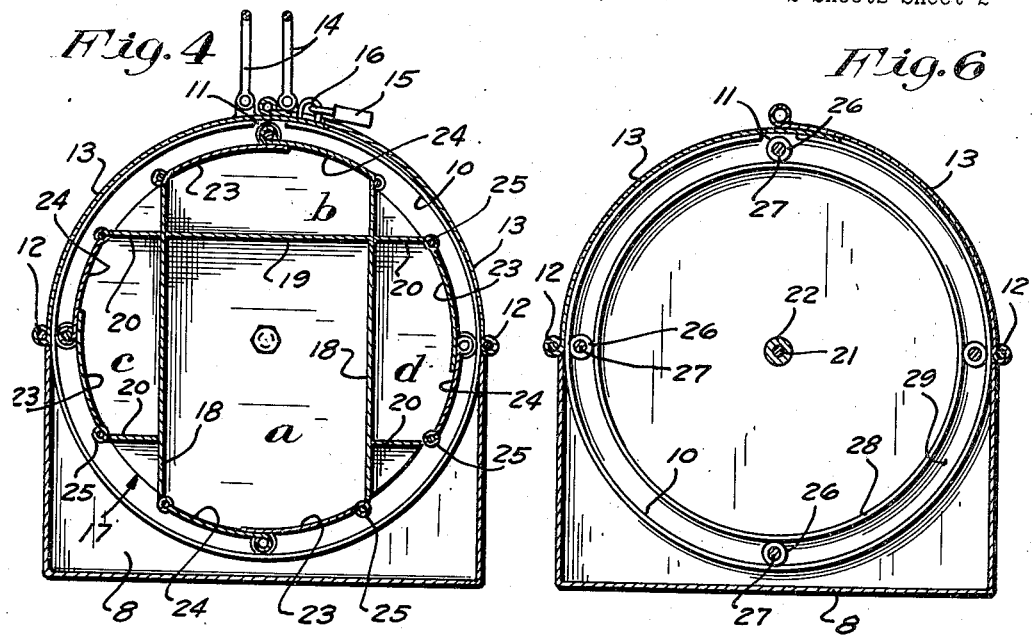
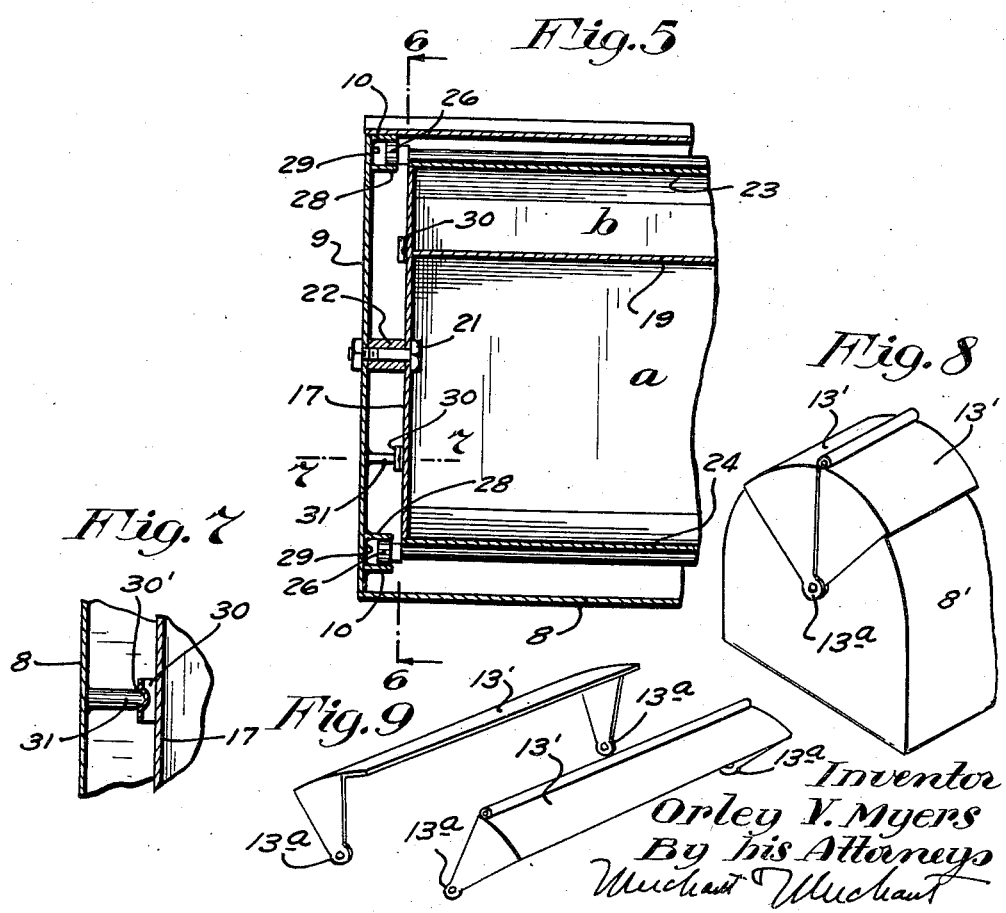
Inventor
Orley V. Myers
By his Attorneys Patented Nov. 29, 1938

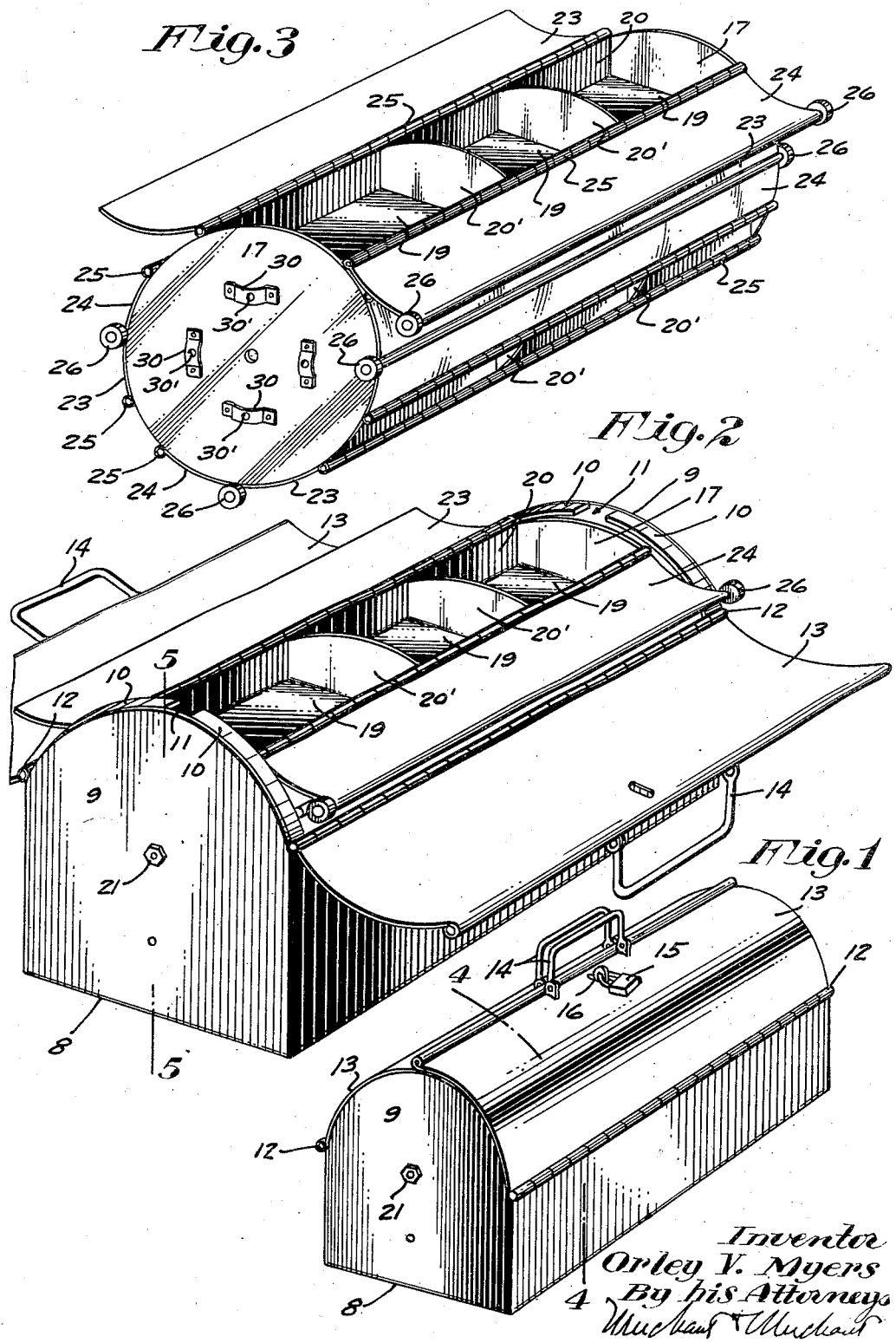

2,138,190

UNITED STATES PATENT OFFICE 2,138,190

FISH TACKLE BOX

Orley V. Myers, Winona, Minn.

Application February 10, 1938, Serial No. 189,794

9 Claims. (Cl. 220—22)

My invention provides a highly efficient multi-compartment box adapted to contain various articles but especially designed and particularly adapted for holding various kinds of fishing tackle.

Generally stated, the invention consists of the novel devices, combinations of devices and arrangement of parts hereinafter described and defined in the claims.

Briefly outlined, the complete box involves an outer casing or container and within the same a rotary drum-like multi-compartment box. The compartments of the rotary box are arranged to be closed by overlapping leaves equipped at the ends of their free edges with projections, preferably in the form of roller-equipped studs, arranged to run against an annular track formed on the ends of the outer container. This arrangement causes the leaves of the compartments to close the respective compartments at all times, except when the particular compartment is turned upward into an accessible position, at which time the stud or projection on the leaves reach a gap in the fixed retaining track or rail, thereby permitting the leaves to be opened to give ready access to the upwardly presented compartment. The container or outer casing is also preferably formed with leaves arranged to be closed to cover up the entire rotary multi-compartment box.

The invention also involves certain other features as will hereinafter appear in connection with the description of the invention illustrated in the accompanying drawings wherein like characters indicate like parts throughout the several views.

Referring to the drawings:

Fig. 1 is a perspective showing the complete device in closed up position suitable for carrying from place to place;

Fig. 2 is a perspective showing the leaves of the outer container and the leaves of the upturned compartment of the rotary box opened up to afford access to the upturned compartment;

Fig. 3 is a perspective showing the rotary drum-like box removed from the container, the leaves of the upper compartment being opened up;

Fig. 4 is a transverse section taken on the line 4—4 of Fig. 1;

Fig. 5 is a fragmentary vertical section taken approximately on the line 5—5 of Fig. 2;

Fig. 6 is a transverse section taken on the line 6—6 of Fig. 5;

Fig. 7 is a fragmentary section taken on the line 7—7 of Fig. 5;

Fig. 8 is a fragmentary perspective of a modification; and

Fig. 9 is a perspective showing in detail the doors for the outer casing removed from Fig. 8, Preferably, all of the major parts of this device are made of thin sheet metal of any suitable finish or kind. The outer casing comprises substantially rectangular base shell or compartment 8 formed with head plates 9, the upper portions of which are substantially semi-circular. To these head plates 9 are secured circular rails or track flanges 10 formed with gaps 11 at the extreme top. Pivoted to the sides of the casing 8, preferably by hinges 12 of the piano hinge type, are segmental cover leaves 13 which, as shown, are provided with carrying handles 14 and are arranged to overlap and be locked together by a padlock or the like 15 applied through a staple 16 secured to one of the leaves and projected through a slot in the other.

The rotary drum-like multi-compartment box is made up of circular head plates 17 and journalled partition plates 18, 19 and 20 that rigidly connect said head plates and divide the box into compartments $a$, $b$, $c$ and $d$. The compartments $b$, $c$ and $d$ are all of the same or possibly the same size and depth, but the compartment $a$ is relatively very deep and hence adapted to contain the larger articles. The head plates 17 are axially pivoted to the head plates of the container 8 by suitable journals which, as shown, are afforded by nut-equipped bolts 21 and spacing sleeves 22.

The several compartments $a$, $b$, $c$ and $d$ are normally closed by segmental cover leaves 23 and 24 that are hingedly connected to the outer edges of the adjacent partition plates, at 25. The leaves 24 overlap the leaves 23, and at the ends of their free edges are provided with trunnion-like projections shown as afforded by rollers 26 journalled on the projecting ends of rods 27 around which, in the structure illustrated, the free edges of the leaves 24 are rolled. The rollers 26 run against the inner surfaces of the rails 10. Also, in the structure illustrated, the head plates of the outer casing or container are formed with inner rails 28 that are concentric to the rails 10, but are spaced therefrom to afford annular roller channels 29. Where the leaves 23 and 24 overlap the edges of the head plate 17, the inner rail 28 would not be required, but said inner rails will perform an important function if the said leaves should be cut short.

With the construction illustrated, as is evident, the outer rails 10 acting on the rollers 26 positively hold the cover leaves 23 and 24 in close position at all times except when one of the compartments is turned upward so that its rollers 26 are aligned with the overlying gap 11 of the rail or retaining flange 10. When one of the compartments is turned upward, as shown in Fig. 4, with its rollers 26 aligned under the gap 11, and at which time, of course, the leaves 13 of the container are opened, as shown in Fig. 2, the leaves of the upturned compartment may then be raised to afford access to the interior of the upturned compartment. Fig. 2 shows the leaves of the container and compartment opened up to afford complete access to the upturned compartment. Preferably, and as shown in Figs. 2 and 3, at least some of the compartments, to wit, compartment b, is sub-divided into a multiplicity of pockets by circumferentially extended laterally spaced divider plates or sub-partitions 20'.

Preferably, and as shown, the leaves 24 are provided with a roller-equipped projection at both ends, and this gives the most secure fastening for the leaves, but the main function would be performed by the trunnion-like projections and retaining rails 10 located at one end of the device.

It is desirable to provide some means for yieldingly stopping and retaining the upturned compartment always with the rollers 26 aligned with the overlying gap 11; and a simple means for accomplishing this result is that the head plates 17 are provided with circumferentially spaced slightly resilient metal clips 30, see Figs. 3, 5 and 7, that have indentations 30' with the engagement of the rounded end of a stud-like projection 31 secured on an adjacent end or head plate of the outer casing 8.

The device above described has been produced and found highly efficient for the purposes in view, and while especially designed for containing fishing tackle, will be found useful for various analogous purposes. The smaller compartments of the rotary box are primarily designed for containing the smaller fishing tackle, such as fish hooks, artificial bait, and the like, while the larger compartment a is adapted to contain fishing reels and the like. The preferred form of the device has been illustrated in the drawings and above described, but it will be understood that the device is capable of various modifications within the scope of the invention herein disclosed and claimed.

In Fig. 5 the outer casing 8 is provided with segmental doors 13' pivoted to the end plates of the casing at 13a. These doors, when open, overlap and do not project from the casing.

What I claim is:

1. In a device of the kind described, an outer casing, a drum-like box rotatably mounted in said casing and having circumferentially spaced compartments, a circular retaining rail on the end of said casing, said rail having a gap at its upper portion, and cover leaves hinged to said box and normally closing the compartments thereof, said leaves having projections working under said retaining rail, but adapted to pass through the gap thereof, to permit opening of the leaves of the upturned compartment.

2. In a device of the kind described, an outer casing having head plates, at least one of which is provided with a circular retaining rail with a gap in its upper portion, a drum-like box rotatably mounted in said casing and having circumferentially spaced compartments, cover leaves hinged to said rotary box and arranged to normally close the respective compartments, said leaves having trunnion-like projections that work under said retaining rail, but are adapted to pass through the gap thereof, when the box is turned to bring the compartments thereof successfully into upturned positions.

3. In a device of the kind described, the combination with an outer casing having head plates provided with circular retaining rails formed with gaps at their upper portions, of a drum-like box rotatably mounted in said casing and provided with circumferentially spaced compartments, cover leaves hinged to said box and arranged to normally close the compartments thereof, said leaves at their ends having trunnion-like projections that work under said rails and normally hold the leaves in closed positions, but adapted to be passed through the gaps of said rails, when a compartment is turned to an upper position.

4. In a device of the kind described, an outer casing having head plates, at least one of which is provided with a circular retaining rail with a gap in its upper portion, a drum-like box rotatably mounted in said casing, on an axis that is coincident with the axis of said retaining rail, said box having circumferentially spaced compartments, and cover leaves hinged to said box and arranged to normally close the compartments thereof, said leaves having trunnion-like projections that work under said rail, but are adapted to pass through the gap thereof to permit the cover leaves of an upturned compartment to be moved to an open position.

5. The structure defined in claim 1 in which the leaves for the several compartments are in pairs, the members of which are arranged to underlap and overlap, and in which the rail engaged portions are on said overlapping leaves.

6. The structure defined in claim 1 in which the compartments of said rotary box are formed by longitudinal partition plates certain of which are parallel and extend completely through the box and certain of which are at right angles to these said parallel plates and divide the box into three shallow and one relatively deep compartments.

7. The structure defined in claim 3 in which the compartments of said rotary box are formed by longitudinal partition plates certain of which are parallel and extend completely through the box and certain of which are at right angles to these said parallel plates and divide the box into three shallow and one relatively deep compartments.

8. The structure defined in claim 2 in which the head plate is provided with the circular retaining rail with gap therein, and is further provided with an unbroken annular rail that is spaced concentrically inward from first noted rail to form a channel in which the stud-like projections of said cover leaves are arranged to run.

9. The structure defined in claim 2 in which the head plate is provided with the circular retaining rail with gap therein, and is further provided with an unbroken annular rail that is spaced concentrically inward from first noted rail to form a channel in which the stud-like projections of said cover leaves are arranged to run, the said concentric rails being duplicated on both head plates and the said stud-like projections being duplicated on opposite ends of said cover leaves.

ORLEY V. MYERS.